E. HÉROGUEZ.
SPRING FRAME FOR CYCLES.
APPLICATION FILED NOV. 18, 1911.

1,045,025.

Patented Nov. 19, 1912.

UNITED STATES PATENT OFFICE.

EDOUARD HÉROGUEZ, OF ANICHES, FRANCE.

SPRING-FRAME FOR CYCLES.

1,045,025.   Specification of Letters Patent.   Patented Nov. 19, 1912.

Application filed November 18, 1911. Serial No. 661,162.

*To all whom it may concern:*

Be it known that I, EDOUARD HÉROGUEZ, a citizen of the French Republic, residing at Aniches, in France, have invented certain new and useful Improvements in Spring-Frames for Cycles, of which the following is a full, clear, and exact description.

This invention has for its object to provide an improved spring frame for cycles for the purpose of suppressing the vibratory shocks resulting from contact with obstacles on the road.

In order that my invention may be clearly understood and more readily carried into practice, I have appended hereunto, one sheet of drawings illustrating the same wherein:—

Figure 1:
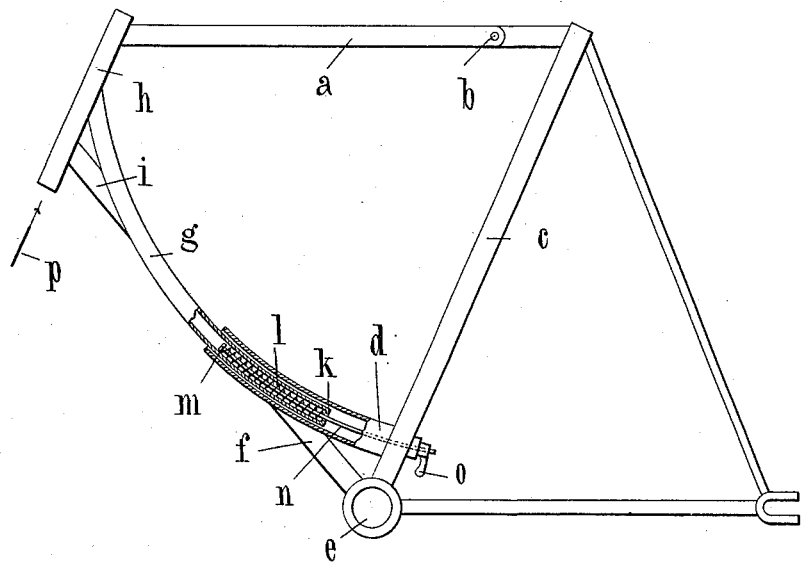
Figure 2:
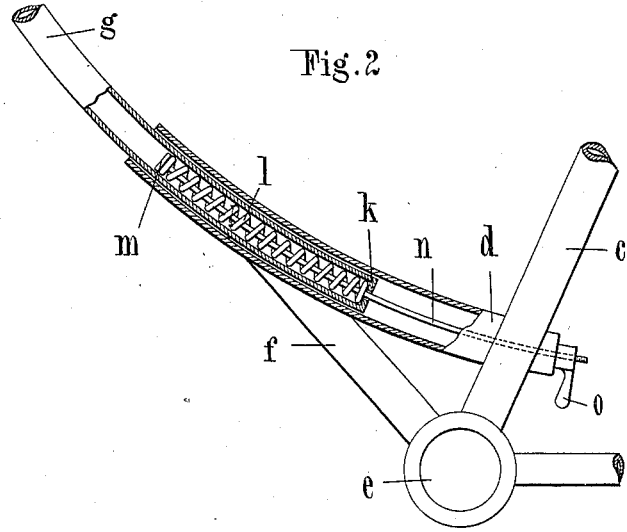

Figure 1, is a view of the invention fitted to a cycle frame. Fig. 2, shows the springing arrangement on a larger scale.

The top tube $a$ is in two lengths, which are united together by means of the pivot pin $b$, the object of which is to prevent bending or flexing of the top tube in a longitudinal direction.

To the tube $c$ in which the seat pillar holding the saddle is placed, is brazed a curved tube $d$, which has the pivot $b$ for the center of curvature. This curved tube is also joined to the bottom bracket $e$ by means of a strengthening tube $f$. Inside the tube $d$ is arranged another tube $g$ which is curved in the same manner as the exterior tube $d$ and which is brazed to the steering column $h$ and reinforced by another tube $i$ which is also brazed to the steering column in like manner.

The free extremity of the tube $g$ is closed by a disk $k$, and $n$ is a rod which passes loosely through tube $c$, into tube $d$, and thence through the disk $k$ into the tube $g$. One end of the rod $n$ projects beyond the tube $c$, and is threaded and carries an adjusting nut $o$, while the other end of rod $n$ has a head $m$, against which one end of a helical spring $l$ bears, the other end of said spring bearing against the disk $k$. The spring $l$, is thus arranged within the tube $g$, around the rod $n$, and the tension of the spring may be regulated according to the weight of the rider by turning the nut $o$, upon the threaded end of the rod $n$ in the proper direction.

When the shocks are produced in the direction indicated by the arrow $p$, the tube $g$ rises and moves around the pivot $b$, while the spring $l$ being compressed absorbs the said shocks. By means of the spring the frame then recovers its normal position.

What I claim is:

1. A spring frame for cycles comprising the upper sectional tube $a$, the sections of which are pivotally connected together, the seat pillar tube $c$, to the upper end of which one section of tube $a$, is rigidly connected, the bracket $e$, to which the lower end of tube $c$, is rigidly connected, the steering column $h$, to which the other section of tube $a$, is rigidly connected, the curved tube $d$, rigidly connected at one end to the tube $c$, and open at its opposite end, the curved tube $g$, slidingly mounted at one end in the tube $d$, and rigidly connected at the opposite end with the column $h$, a spring arranged within the tube $g$, and having a bearing at one end on the closed free end of tube $g$, and a rod extending within the tubes $d$ and $g$, and having a head against which the other end of said spring bears.

2. A spring frame for cycles comprising the upper sectional tube $a$, the sections of which are pivotally connected together, the seat pillar tube $c$, to the upper end of which one section of tube $a$, is rigidly connected, the bracket $e$, to which the lower end of tube $c$, is rigidly connected, the steering column $h$, to which the other section of tube $a$, is rigidly connected, the curved tube $d$, rigidly connected at one end to the tube $c$, and open at its opposite end, the curved tube $g$, slidingly mounted at one end in the tube $d$, and rigidly connected at the opposite end with the column $h$, a spring arranged within the tube $g$, and having a bearing at one end on the closed free end of tube $g$, a rod extending within the tubes $d$ and $g$, and having a head against which the other end of said spring bears, said rod having that end opposite to that carrying the head threaded, and an adjusting nut screwing on the threaded end of the rod for the purpose set forth.

In testimony whereof I affix my signature in presence of two witnesses.

EDOUARD HÉROGUEZ.

Witnesses:
 MAURICE PICARD,
 HANSON C. COXE.

Copies of this patent may be obtained for five cents each, by addressing the "Commissioner of Patents, Washington, D. C."